United States Patent
Matsuo et al.

(10) Patent No.: US 10,102,825 B2
(45) Date of Patent: Oct. 16, 2018

(54) METHOD AND PROGRAM FOR PROCESSING IMAGE WITHIN DISPLAY SCREEN

(71) Applicant: K&M ENTERPRISE Inc., Fukuoka (JP)

(72) Inventors: Katsunori Matsuo, Fukuoka (JP); Yoshikazu Inoue, Fukuoka (JP); Takahide Matsuo, Fukuoka (JP)

(73) Assignee: K&M ENTERPRISE Inc., Fukuoka (JP)

( * ) Notice: Subject to any disclaimer, the term of this patent is extended or adjusted under 35 U.S.C. 154(b) by 32 days.

(21) Appl. No.: 15/361,252

(22) Filed: Nov. 25, 2016

(65) Prior Publication Data

US 2017/0084252 A1 Mar. 23, 2017

Related U.S. Application Data

(63) Continuation of application No. PCT/JP2016/064815, filed on May 19, 2016.

(30) Foreign Application Priority Data

Jun. 30, 2015 (JP) ................................ 2015-131459

(51) Int. Cl.
  *G09G 5/14* (2006.01)
  *G06T 3/40* (2006.01)
  (Continued)

(52) U.S. Cl.
  CPC ................ *G09G 5/14* (2013.01); *G06T 3/40* (2013.01); *G08B 13/19602* (2013.01);
  (Continued)

(58) Field of Classification Search
  CPC ........................... G09G 5/14; G08B 13/19602
  See application file for complete search history.

(56) References Cited

U.S. PATENT DOCUMENTS

| | | | |
|---|---|---|---|
| 2001/0010731 A1* | 8/2001 | Miyatake | G06K 9/3241 382/103 |
| 2002/0057840 A1* | 5/2002 | Belmares | G08B 13/19602 382/218 |

(Continued)

FOREIGN PATENT DOCUMENTS

| | | |
|---|---|---|
| JP | 2003-255442 A | 9/2003 |
| JP | 2005-222424 A | 8/2005 |

(Continued)

OTHER PUBLICATIONS

International Search Report issued in PCT/JP2016/064815, dated Aug. 2, 2016 (3 pages).

(Continued)

*Primary Examiner* — Ryan R Yang
(74) *Attorney, Agent, or Firm* — Nakanishi IP Associates, LLC

(57) ABSTRACT

Provided are a method and a program for image processing to output intended information from image data of an arbitrary frame, directly utilizing an image displayed in imaging software such as a browser used in a computer or the like. The method for processing an image within a display screen includes the steps of: setting one or more arbitrary set areas on a display screen; sequentially transferring pieces of image data for the set areas to a memory; performing intended determination by data processing to the pieces of image data in the memory; and externally outputting a result of the determination. The result of the determination may be output as information based on software, as an electric signal to one of a serial port and a parallel port, or to a network, in a form of one of e-mail, information data, and image data. Further, a name may be individually assigned to each of the one or more areas on the display (Continued)

screen, and different image data processing may be performed to the plurality of set areas.

14 Claims, 18 Drawing Sheets

(51) Int. Cl.
    *G08B 13/196*     (2006.01)
    *G09G 5/00*     (2006.01)

(52) U.S. Cl.
    CPC ............. *G09G 5/003* (2013.01); *G09G 5/005* (2013.01); *G09G 2320/10* (2013.01); *G09G 2320/103* (2013.01)

(56) References Cited

U.S. PATENT DOCUMENTS

2003/0227548 A1* 12/2003 Kawakami ............ H04N 7/183
                                                                                              348/152
2005/0189471 A1     9/2005 Nagasawa

FOREIGN PATENT DOCUMENTS

| JP | 2006-285507 A | 10/2006 |
| JP | 2009-239507 A | 10/2009 |
| JP | 2014-123276 A | 7/2014 |

OTHER PUBLICATIONS

Written Opinion of International Searching Authority issued in PCT/JP2016/064815, dated Aug. 2, 2016 (4 pages).

\* cited by examiner

FIG. 9

| |
|---|
| DISPLAY: ALERTING MESSAGE AND DETECTION POSITION INFORMATION ARE DISPLAYED ON SCREEN. |
| SOUND: ALERTING SOUND IS OUTPUT. BEEP SOUND OR REGISTERED SOUND FILE IS REPRODUCED. |
| OPERATION: AUTOMATED MANIPULATION OF MOUSE OR KEYBOARD IS PERFORMED BY SOFTWARE. |
| IMAGE: IMAGE AT DETECTION IS STORED (STILL IMAGE, MOVING IMAGE) |
| RECORD: LOG OF CONDITION, AND TIME AND DATE OF DETECTION ARE STORED. |

FIG. 10

| PARALLEL CABLE: CONTACT OUTPUT, LIGHTING OF ALARM LAMP, AND THE LIKE. |
|---|
| SERIAL CABLE: OUTPUT TO DEVICE CONNECTED BY USB CABLE, RS232C, RS485, OR THE LIKE. |
| LAN CABLE: OUTPUT TO DEVICE CONNECTED VIA NETWORK. |

FIG. 11

| |
|---|
| E-MAIL: SENDING ALERT MAIL TO PREVIOUSLY REGISTERED E-MAIL ADDRESS |
| SERVER: ALERT NOTIFICATION TO SPECIFIED SERVER (ALERT PROCESSING IS PERFORMED BY SERVER) |
| REMOTE OPERATION: OPERATING DEVICE AT REMOTE PLACE |

FIG. 15

| NUMBER | SENSOR NAME | TYPE SELECTION | POSITION AND SIZE | DETAILED SETTING | CONDITION |
|---|---|---|---|---|---|
| ☑1 | SUSPICIOUS PERSON DETECTION | OBJECT DETECTION ▼ | SETTING | SETTING | ☐ |
| ☑2 | CAMERA CONFIRMATION | COMPARISON DETERMINATION ▼ | SETTING | SETTING | ☐ |
| ☐3 | SENSOR 3 | NO SETTING ▼ | SETTING | SETTING | ☐ |
| ☐4 | SENSOR 4 | NO SETTING | | SETTING | ☐ |
| ☐5 | SENSOR 5 | NO SETTING ▼ | SETTING | SETTING | ☐ |
| ☐6 | SENSOR 6 | NO SETTING ▼ | SETTING | SETTING | ☐ |
| ☐7 | SENSOR 7 | NO SETTING | | SETTING | ☐ |
| ☐8 | SENSOR 8 | NO SETTING | SETTING | SETTING | ☐ |

| NUMBER | LOGICAL SENSOR NAME | DEFINITIONAL IDENTITY | DEFINITION SETTING | CONDITION |
|---|---|---|---|---|
| ☑1 | ABNORMITY DETECTION | L1=S1+S2 | SETTING | ☐ |
| ☐2 | LOGICAL SENSOR 2 | L2=0 | SETTING | ☐ |
| ☐3 | LOGICAL SENSOR 3 | L3=0 | SETTING | ☐ |
| ☐4 | LOGICAL SENSOR 4 | L4=0 | SETTING | ☐ |

| NUMBER | OUTPUT NAME | OUTPUT CONDITION | OUTPUT CONTENT | OUTPUT SETTING | CONDITION |
|---|---|---|---|---|---|
| ☑1 | LIGHT UP ALERT LAMP | L1=1 | CONTACT POINT | SETTING | ☐ |
| ☑2 | SEND E-MAIL TO TECHNICAL PERSON | L2=1 | E-MAIL | SETTING | ☐ |
| ☐3 | OUTPUT 3 | | | SETTING | ☐ |
| ☐4 | OUTPUT 4 | | | SETTING | ☐ |
| ☐5 | OUTPUT 5 | | | SETTING | ☐ |
| ☐6 | OUTPUT 6 | | | SETTING | ☐ |

FIG. 16

CLICKING HERE SHOWS FUNCTION LIST

| NUMBER | SENSOR NAME | TYPE SELECTION | POSITION AND SIZE | DETAILED SETTING | CONDITION |
|---|---|---|---|---|---|
| □1 | SENSOR 1 | NO SETTING | SETTING | SETTING | □ |
| □2 | SENSOR 2 | NO SETTING / MOTION DETECTION / COLOR DETECTION / OBJECT DETECTION / POINT GAUGE | SETTING | SETTING | □ |
| □3 | SENSOR 3 | | SETTING | SETTING | □ |
| □4 | SENSOR 4 | | SETTING | SETTING | □ |
| □5 | SENSOR 5 | NO SETTING | SETTING | SETTING | □ |
| □6 | SENSOR 6 | NO SETTING | SETTING | SETTING | □ |
| □7 | SENSOR 7 | NO SETTING | SETTING | SETTING | □ |
| □8 | SENSOR 8 | NO SETTING | SETTING | SETTING | □ |

| NUMBER | LOGICAL SENSOR NAME | DEFINITIONAL IDENTITY | DEFINITION SETTING | CONDITION |
|---|---|---|---|---|
| □1 | LOGICAL SENSOR 1 | L1=0 | SETTING | □ |
| □2 | LOGICAL SENSOR 2 | L2=0 | SETTING | □ |
| □3 | LOGICAL SENSOR 3 | L3=0 | SETTING | □ |
| □4 | LOGICAL SENSOR 4 | L4=0 | SETTING | □ |

| NUMBER | OUTPUT NAME | OUTPUT CONDITION | OUTPUT CONTENT | OUTPUT SETTING | CONDITION |
|---|---|---|---|---|---|
| □1 | OUTPUT 1 | | | SETTING | □ |
| □2 | OUTPUT 2 | | | SETTING | □ |
| □3 | OUTPUT 3 | | | SETTING | □ |
| □4 | OUTPUT 4 | | | SETTING | □ |
| □5 | OUTPUT 5 | | | SETTING | □ |
| □6 | OUTPUT 6 | | | SETTING | □ |

FIG. 17

| NUMBER | SENSOR NAME | TYPE SELECTION | POSITION AND SIZE | DETAILED CONDITION |
|---|---|---|---|---|
| ☑1 | RED LAMP DETECTED | COLOR DETECTION | SETTING | SETTING |
| ☑2 | INTRUDER DETECT | MOTION DETECTION | SETTING | SETTING |
| ☐3 | SENSOR 3 | NO SETTING | SETTING | SETTING |
| ☐4 | SENSOR 4 | NO SETTING | SETTING | SETTING |
| ☐5 | SENSOR 5 | NO SETTING | SETTING | SETTING |
| ☐6 | SENSOR 6 | NO SETTING | SETTING | SETTING |
| ☐7 | SENSOR 7 | NO SETTING | SETTING | SETTING |
| ☐8 | SENSOR 8 | NO SETTING | SETTING | SETTING |

| NUMBER | LOGICAL SENSOR NAME | DEFINITIONAL IDENTITY | DEFINITION CONDITION |
|---|---|---|---|
| ☑1 | THERE IS INTRUDER WHEN LAMP IS RED | L1=S1*S2 | SETTING |
| ☐2 | LOGICAL SENSOR 2 | L2=0 | SETTING |
| ☐3 | LOGICAL SENSOR 3 | L3=0 | SETTING |
| ☐4 | LOGICAL SENSOR 4 | L4=0 | SETTING |

| NUMBER | OUTPUT NAME | OUTPUT CONDITION | OUTPUT CONTENT | OUTPUT SETTING |
|---|---|---|---|---|
| ☑1 | ALERTING SOUND MESSAGE | L1=1 | SOUND | SETTING |
| ☐2 | OUTPUT 2 | | | SETTING |
| ☐3 | OUTPUT 3 | | | SETTING |
| ☐4 | OUTPUT 4 | | | SETTING |
| ☐5 | OUTPUT 5 | | | SETTING |
| ☐6 | OUTPUT 6 | | | SETTING |

USE S1 AND S2

SET SENSOR NAME

SELECT SENSOR FUNCTION

S1 AND S2 ARE ON, AND L1 IS ON

OUTPUT SOUND MESSAGE WHEN L1 IS ON

FIG. 18

METHOD AND PROGRAM FOR PROCESSING IMAGE WITHIN DISPLAY SCREEN

CROSS-REFERENCE TO RELATED APPLICATIONS

This application is a continuation application of International Patent Application No. PCT/JP2016/064815 filed on May 19, 2016, which claims priority to Japanese Patent Application No. 2015-131459 filed on Jun. 30, 2015, the entire contents of which are incorporated by reference.

TECHNICAL FIELD

The present invention relates to a method and a program for image processing to output intended information from image data of an arbitrary area within a display such as a still image or a moving image (hereinafter referred to as a "display screen"), displayed on a display of an information device such as personal computer (PC), smartphone, or a tablet terminal (hereinafter also simply referred to as a "computer or the like").

BACKGROUND ART

A screen displayed in a monitor (display) of the computer or the like is displayed in a browser such as Internet Explorer (IE: trademark) or Firefox (trademark), for example, and is operated with software such as Windows (trademark) OS, iOS (trademark), or Android (trademark). There is also provided a system for displaying an image taken by a WEB camera or the like on a monitor of a computer or the like.

Conventionally, such monitoring of a person or an object using an image of a monitoring target displayed on a monitor of a computer or the like requires a person constantly watching the image.

Patent Document 1 proposes one example of a monitoring device employing a camera. Specifically, to image data taken by imaging means, a landscape-oriented rectangular specific area parallel to a transversal plane of a frame image is set by specific area setting means, image data of the specific area is taken out by image data processing means for each of a plurality of frame images, and a motion vector is extracted from the taken out image data. In addition, change detecting means determines that it is dangerous as another mobile object is too close to own mobile object when a value obtained by addition of a vector value in a predetermined direction in motion vector information is greater than a threshold that has been set by change detection threshold setting means, and notifies a driver of the danger by alerting sound and alerting display via change notifying means.

PRIOR ART DOCUMENT

Patent Document

Patent Document 1: JP 2005-222424 A

SUMMARY OF THE INVENTION

Problems to be Solved by the Invention

However, the conventional method of constant monitoring of a display by a person has the following problems.
(1) There is a possibility of undetection due to fatigue, looking aside, or carelessness of a monitoring person.
(2) There are many problems in automation (elimination of personnel).
   A developer of a system is unable to respond to automation (of image data processing, or the like).
   When upgrading a version, it is necessary to stop the system.
   In case of failure (including false detection), it is not possible to restore easily.
   A possibility of occurrence of an unexpected problem associated with a system change.
(3) Software for performing specialized detection or the like (such as detection of a change or response to a change in brightness at a specific location) has been generally expensive.
(4) There is a camera or the like that may not be operated with the computer or the like (compatibility with devices).

Further, the monitoring device described in Patent Document 1 listed above is a device dedicated for monitoring, and it is difficult to perform monitoring by a browser or imaging software employing the computer or the like.

Thus, an object of the present invention is to provide a method and a program for image processing to output intended information from image data of an arbitrary area, directly utilizing an image displayed in imaging software such as a browser used in a computer or the like.

Solutions to the Problems

In order to address the above problems, a first configuration of the present invention provides a method for processing an image within a display screen, the method including the steps of:
  setting one or more arbitrary areas on a display screen;
  sequentially obtaining pieces of image data for the set areas from image data displayed on the display screen and transferring the obtained pieces of image data to a memory;
  performing intended determination by data processing to the pieces of image data in the memory; and
  externally outputting a result of the determination.

A second configuration of the present invention provides an image processing program causing a computer to function as:
  means of setting one or more arbitrary areas on a display screen;
  means of sequentially transferring pieces of image data for the set areas to a memory;
  means of performing intended determination by data processing to image data in the memory; and
  means of externally outputting a result of the determination.

In the above inventions, the result of the determination may be output as information based on software.

Further, the result of the determination may be output as an electric signal to one of a serial port and a parallel port.

Moreover, the result of the determination may be output to a network, in a form of one of e-mail, information data, and image data. Here, examples of the network include Near Field Communication networks such as Bluetooth (registered trademark) and infrared communication.

Further, either a different or an identical type of data processing may be performed to corresponding pieces of image data for the plurality of areas on the display screen, at least one of a position and a size of each of the pieces of image data being either different from or identical to a position and a size of another piece of image data, the different or identical data processing being executed individually or in combination with data processing to another area.

Moreover, a name may be individually assignable to each of the one or more areas on the display screen, and when the result of the determination is output, the name of the corresponding area may be attached to the output.

Examples of processing of image data to perform intended determination are, but not limited to, the following:
- change detection;
- motion detection (object);
- quiescence detection (object);
- color detection (arbitrary color range and size);
- measurement processing (such as size measurement and water level measurement);
- inspection processing (abnormality detection and normality determination); and
- filtering processing (such as brightness manipulation and feature extraction).

Examples of output of result of data processing of image data and intended determination are, but not limited to, the following:
- e-mail notification to a different communication terminal (communication terminal: a device having a such as a personal computer, a mobile phone, a smartphone, or a tablet);
- event notification to a different communication terminal (such as network or serial communication);
- alerting sound (by a loudspeaker of a main body or an external device);
- output (such as contact point or serial communication);
- storing image (storing as a file: a moving image or a still image);
- automated manipulation of a display terminal (touch panel, mouse, or keyboard); and
- notification to device.

Effects of the Invention

According to the present invention, it is possible to provide the following effects.
(1) Operations that have been performed by a person visually seeing a specific situation and making determination:
  e.g.) causing a system having only a monitoring function to be an automated monitoring system; and
  e.g.) enabling reduction of personnel for monitoring of a monitor.
(2) No effect is given to a different software (system) or device (operated as separate software).
  As being provided as software only, there is no problem of compatibility with devices.
  It is sufficient to read a display screen, and there is no access to hardware.
(3) It is possible to restore at any time, and restart at any time (limited to start-up operation of software).
(4) As being provided as software only, it is possible to easily replace functions.
(5) As being provided as software only, it is possible to realize at low costs.

BRIEF DESCRIPTION OF THE DRAWINGS

FIG. 9 is an illustrative diagram showing an example of software output in the embodiment of the present invention.

FIG. 10 is an illustrative diagram showing an example of an output to a cable-connected device in the embodiment of the present invention.

FIG. 11 is an illustrative diagram showing an example of an output via a network (Internet) in the embodiment of the present invention.

FIG. 15 is an area setting screen (initial screen) of a practical example according to the present invention.

FIG. 16 is a screen showing a setting example of the practical example according to the present invention.

FIG. 17 is a screen showing a setting example of the practical example according to the present invention.

FIG. 18 is a screen showing a setting example of the practical example according to the present invention.

DESCRIPTION OF REFERENCE SIGNS

10: OS
20: Monitoring system
30: Display screen
32: Monitored image
34: Set area
40: Extra software

EMBODIMENT OF THE INVENTION

Hereinafter, the present invention will be described specifically based on its embodiment.

Figure 1:
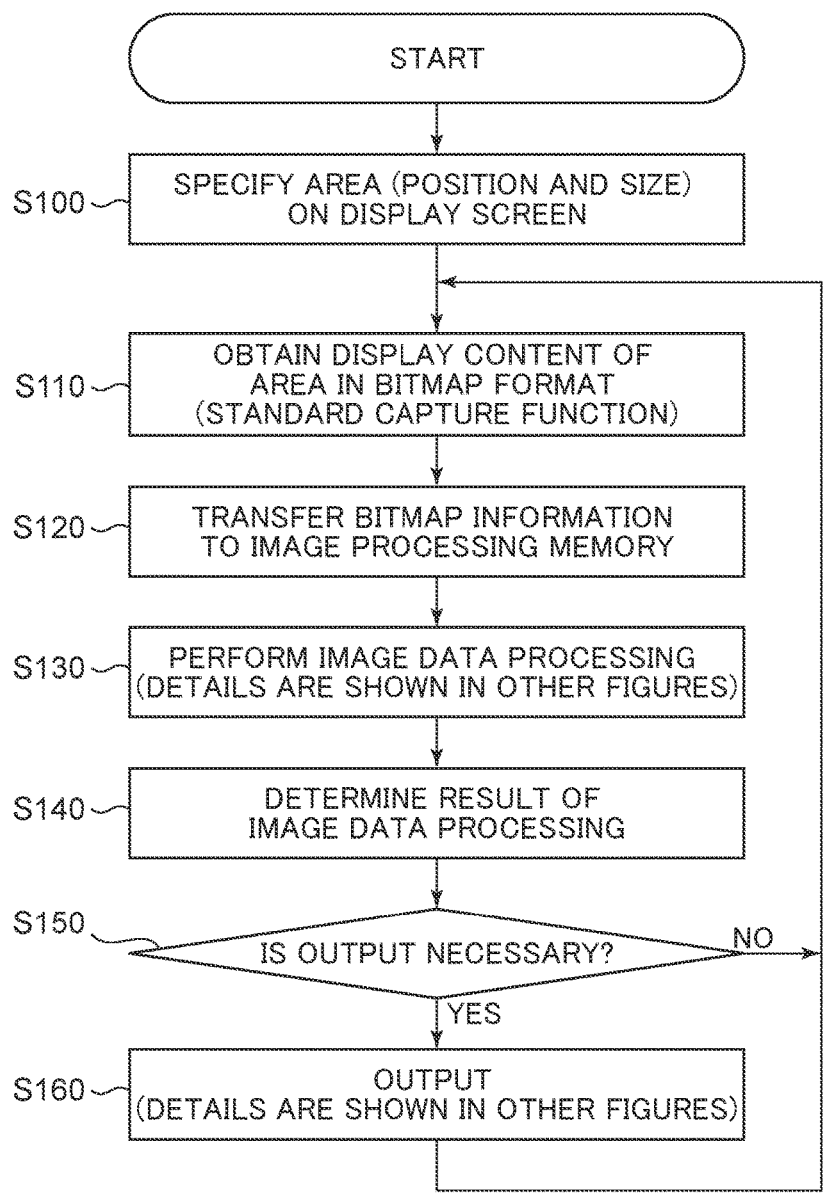
FIG. 1 is a flowchart showing processing steps in an image processing system according to an embodiment of the present invention.

FIG. 1 is a flowchart showing processing steps in an image data processing system according to this embodiment. It should be noted that, while this embodiment describes an example in which the image data processing system of this embodiment is realized by running an image data processing program of this embodiment on a personal computer as an information device, a different type of device such as a smartphone and a tablet terminal can be used as long as the device has a display function and the image data processing program of this embodiment may be added and executed on the device.

Each of the steps shown in FIG. 1 will be described.

Step S100: Set a single area (position and size) on a display screen of a personal computer. The specification of the area is performed by setting a rectangular frame (Windows pane), for example, by clicking of a mouse at a starting point of the area and dragging to a diagonal position. The area is hidden and not displayed during execution of the processing.

If more than one area is set, the above operation is repeated in the same manner.

Step S110: Obtain image data in the area that has been set in a bitmap format from the image data displayed on the display screen of the personal computer (standard capture function). The obtained image data in a bitmap format is brightness information (0-255) in R, G, and B per pixel. The standard capture function of OS is executed by the image data processing program of this embodiment.

Here, an example of the image data processing program executing the standard capture function of OS will be described. The following is an example of a program source for executing the standard capture function using .NET library provided by Microsoft .NET Framework 2.0 and after as a Windows component supporting execution on Windows which is an OS developed by Microsoft Corporation.

1. Creation of a Bitmap Object to be Captured

Bitmap bmp=new Bitmap (area.Width, area.Height);

(bmp: define storage bitmap, area: information of position and size of a rectangular area that has been set, area.Width, area.Height: width and height of the area)

2. Creation of a Graphics Object

Graphics gp=Graphics.FromImage(bmp);

(a Graphic object is created from a Bitmap object because Graphic object can use CopyFromScreen)

3. Capture Using a CopyFromScreen Method

Gp.CopyFromScreen (area.Left, area.Top, 0, 0, bmp.Size);

(area.Left, area.Top: left top coordinates in the area, bmp.Size: size of bmp)

From the above, the image data for the rectangular area set in bmp is obtained in a bitmap format from the image data displayed on the display screen of the personal computer. The rectangular image data thus obtained is taken out as it is or in an arbitrary specified shape such as a polygon, a circle, or a circular arc.

Step S120: Transfer bitmap information of the image data (brightness information in R, G, and B) to an image data processing memory. As the bitmap information is in a special format, the bitmap information is arranged as a simple data (array) on the memory. This makes it easily readable by the program.

Step S130: Perform previously specified image data processing (later described in detail). The data processing includes still image processing and moving image processing.

Step S140: Determine a result of the image data. The determination is performed by comparing a result obtained by the image data processing with a determination standard.

Step S150: Determine whether an output is necessary. If it is determined that the output is necessary, the operation proceeds to Step S160. If not, the operation returns to Step S110.

Step S160: Execute the output (the detail will be described later). After the execution, the operation returns to Step S110.

Figure 2:
FIG. 2 is a flowchart for still image data processing in the embodiment of the present invention.

FIG. 2 is a flowchart for still image data processing. In this example, the data processing is performed to a piece of the image data that has been last obtained. For example, appearance inspection, positioning, size measurement, or color determination is performed. Information on a result of the processing is output.

Figure 3:
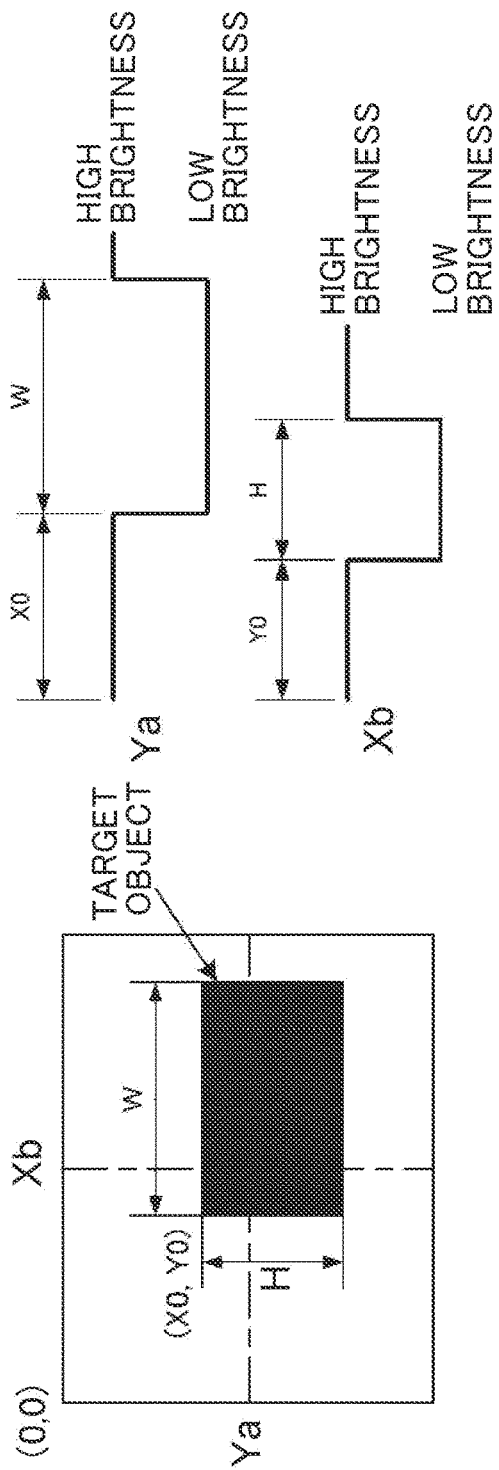
FIG. 3 is an illustrative diagram showing an example of simple position and size measurement in the embodiment of the present invention.

FIG. 3 shows an example of simple position and size measurement. Pieces of the image data are successively arranged in a memory in an area of an image width and an image height. In the image data, a dark color takes a smaller value, and a bright color takes a greater value. When reading a horizontal line in FIG. 3, Ya×image width (Ya is an initial value in a height direction when finding a position and a size of a target object in a transverse direction, and generally starting from a position near the center of the area) is added to a head of an image memory, and the data is read successively.

A result of the reading of the horizontal line shows a position X0 and the width of the target object in the transverse direction.

When reading a vertical line, Xb (Xb is an initial value in the transverse direction when finding a position and a size of a target object in a longitudinal direction, and generally starting from a position near the center of the area) is added to the head of the image memory, and the data is read at intervals of the image width.

A result of the reading of the vertical line shows a position Y0 and the height of the target object in the longitudinal direction.

As a result, an upper left position (X0, Y0) and a size (size: W×H) of the target object are determined.

If deviation from the predetermined position and size occurs, some kind of alerting output (such as a contact point, sound, or e-mail) is output.

It should be noted that the arrangement of the image data in the memory is such that pieces of pixel data that constitute the image data are stored to the right end starting from a position at Y=0 in the height direction and X=0 in the transverse direction in a manner adding (+1) to X. When it comes to the right end, pieces of the pixel data are arranged in a manner adding (+1) to X starting from a position at Y=1, X=0. In this manner, pieces of the pixel data are stored to the bottom end in the height direction. Here, the memory arrangement is made in a manner in which the longitudinal and transverse directions are inverted.

Figure 4:
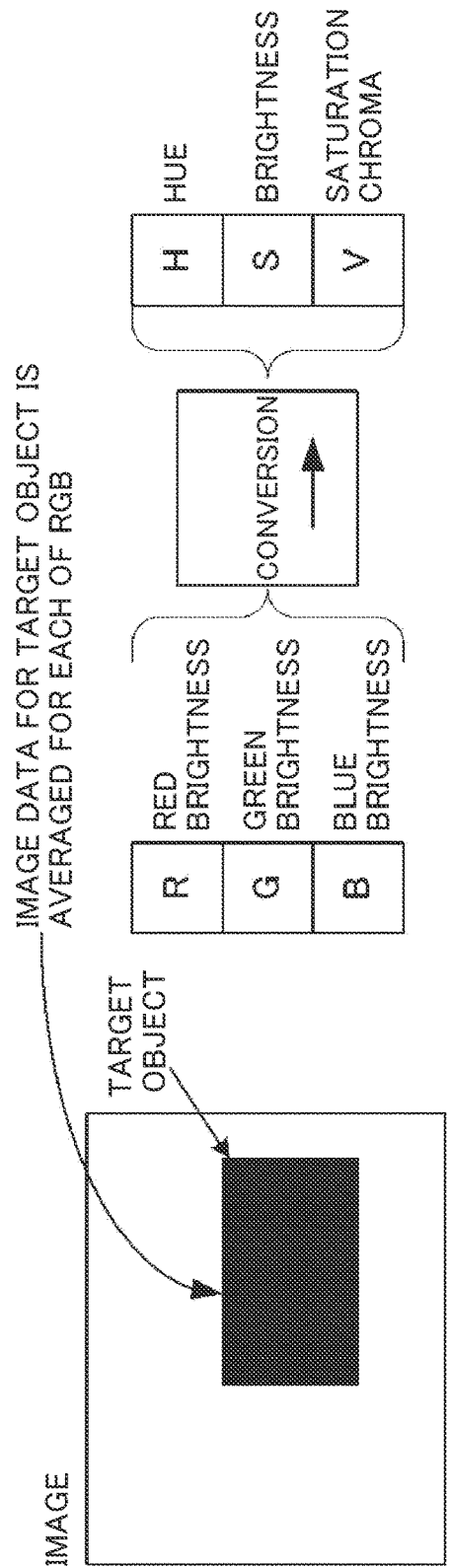
FIG. 4 is an illustrative diagram showing an example of color measurement in the embodiment of the present invention.

FIG. 4 shows an example of color measurement.

The image data for the area of the target object which area's position and size are known is read and averaged for each of R, G, and B. The date (R, G, and B) is then converted into a color space HSV (Hue, Saturation chroma, Value Lightness Brightness).

With this, a color of the target object is known.

If the color is not a predetermined color, some kind of alerting output (such as a contact point, sound, or e-mail) is output.

Figure 5:
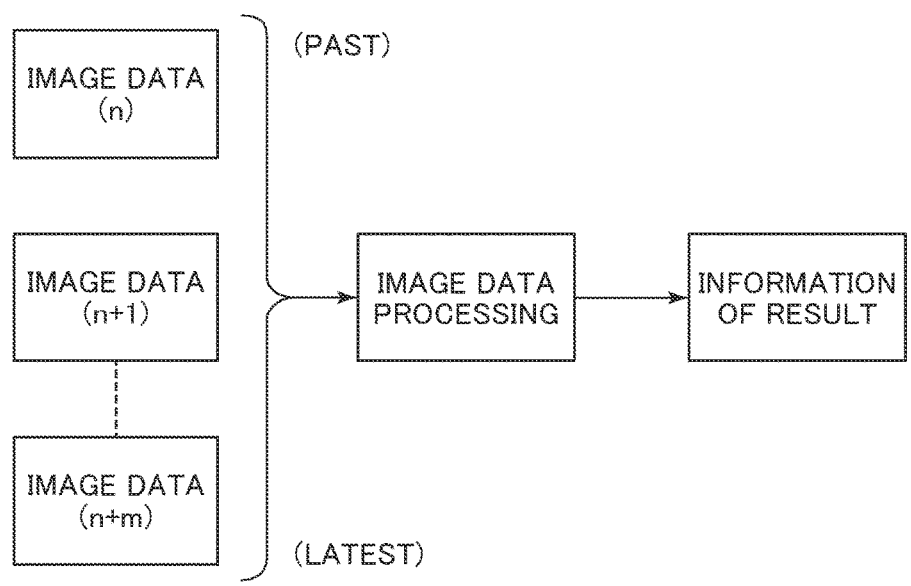
FIG. 5 is a block diagram showing an example of moving image data processing in the embodiment of the present invention.

FIG. 5 shows an example of moving image data processing.

The processing is performed to a plurality of past to latest pieces of image data that are successive.

In a case of the moving image data processing, a required number of old pieces of the image data are stored.

With this, it is possible to output a result of processing such as motion detection, quiescence detection, change detection, foreign object detection. For example, this can be applied to intrusion detection, a motion of the target object, stoppage detection, passage count, and traffic count of people and cars.

Figure 6:
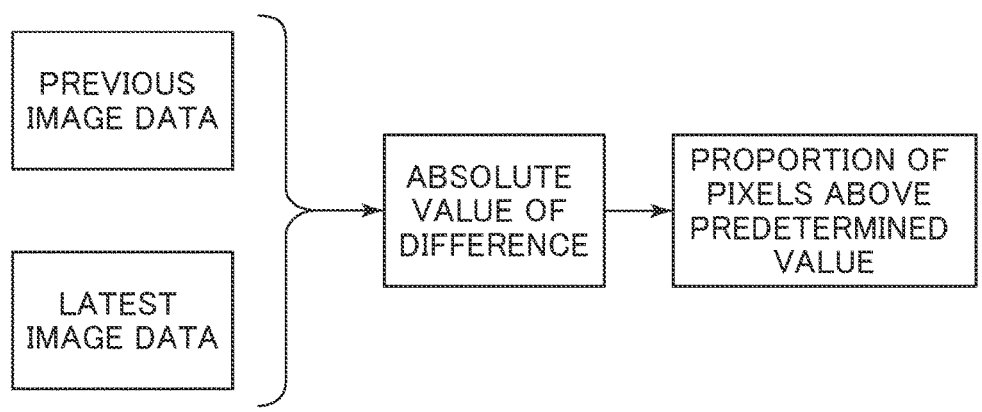
FIG. 6 is a block diagram showing an example of simple motion detection in the embodiment of the present invention.

FIG. 6 shows an example of simple motion detection.

An absolute value of a difference between the latest piece of image data and a previous piece of image data is calculated per pixel each of RGB.

A proportion of a number of pixels whose absolute value of the difference is not smaller than a predetermined value is calculated.

If the proportion is greater than a reference value, it is determined that there is a motion, and some kind of alerting output (such as a contact point, sound, or e-mail) is output.

Figure 7:
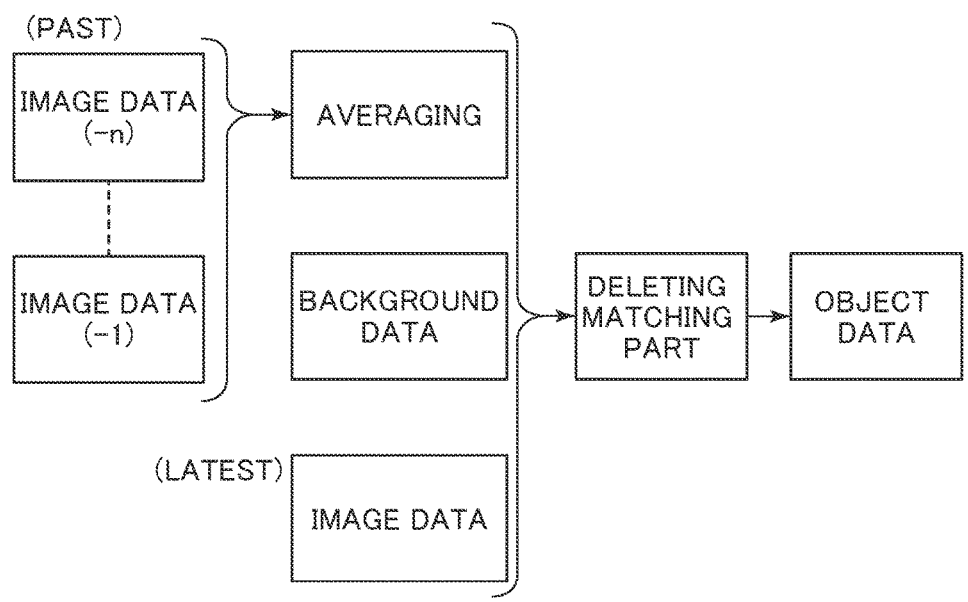
FIG. 7 is a block diagram showing an example of simple object extraction in the embodiment of the present invention.

FIG. 7 shows an example of simple object extraction.

An average image of past N pieces of image data (a moving average in chronological order) is created and set as a background image.

A portion of the latest piece of image data common to the background image is deleted.

The rest of the data constitutes object image data.

The data for the object image is scanned, and the individual size and shape are obtained.

If the size and shape match a determination condition, some kind of alerting output (such as a contact point, sound, or e-mail) is output as object detection.

The color determination may also be added as a condition.

Figure 8:
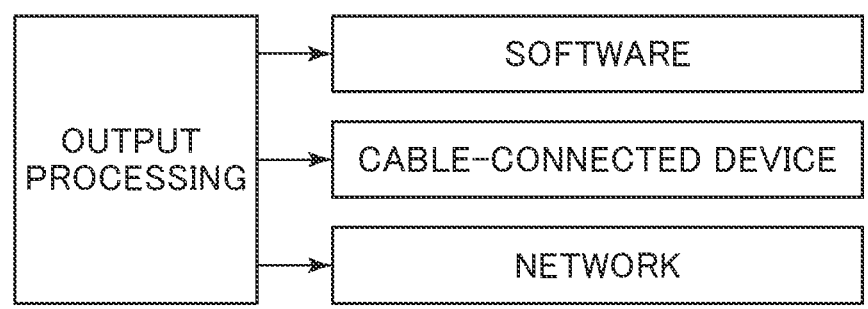
FIG. 8 is a block diagram showing an example of an output in the embodiment of the present invention.

FIG. 8 shows an example of an output of a result of the determination.

Outputs of the result of the determination are classified into three groups:
  output as information based on software;
  output as an electric signal to a cable-connected device connected to a serial port or a parallel port; and
  output to a network, in a form of e-mail, information data, or image data.

FIG. 9 shows an example of software output.

Examples of software output include display, sound, operation, image, and record.

Display: An alerting message is displayed on the screen to call attention. A display on a detected portion is shown to indicate the location.

Sound: Standard beep sound is output, or a registered sound file is reproduced.

Operation: A mouse or keyboard manipulation is performed by software based on previously registered information.

Image: An image at detection is stored as a still image or a moving image.

Record: A log of the occurred event such as time and date and its content is stored.

FIG. 10 shows an example of an output to a cable-connected device.

Examples of the cable connection include parallel, serial, and LAN.

Parallel connection is employed in controlling a contact output and an alarm lamp.

A serial cable is used in controlling a USB device or a device connected by RS232C or RS485.

A LAN cable is used in controlling a device compatible with network connection.

The type of the device to be used varies depending on its purpose.

FIG. 11 shows an example of an output via the network (Internet).

Notification to a remote place is made via the Internet. Alternatively, bulk e-mail is sent to e-mail addresses that are previously registered.

It is also possible to select destination to send e-mail depending on a case.

In a case in which an administrative server is installed, it is possible to perform system processing by making event notification to the server. It is also possible to control a device at a remote place by an output.

It should be noted that examples of the network also include Near Field Communication networks such as Bluetooth (registered trademark) and infrared communication, in addition to the Internet, a wireless LAN, and a wired LAN.

Next, a case in which detection and notification functions are added to a monitoring system for monitoring a monitor by a person will be described.

Figure 12:
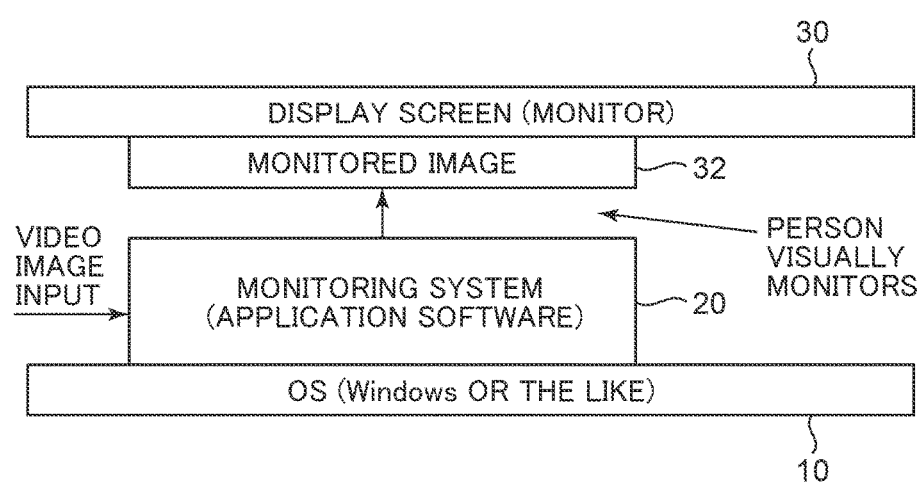
FIG. 12 is a block diagram showing a configuration of software for monitoring a target.

FIG. 12 shows a configuration of a monitoring system for monitoring a target.

The monitoring system shown in FIG. 12 is such that a monitoring system 20 that runs on an OS 10 such as Windows (trademark) takes an image from a camera or the like and displays the image on a display screen 30, and a person visually confirms abnormity in a monitored image 32. However, it is unavoidable to miss a monitoring target due to carelessness or looking aside of the person.

Figure 13:
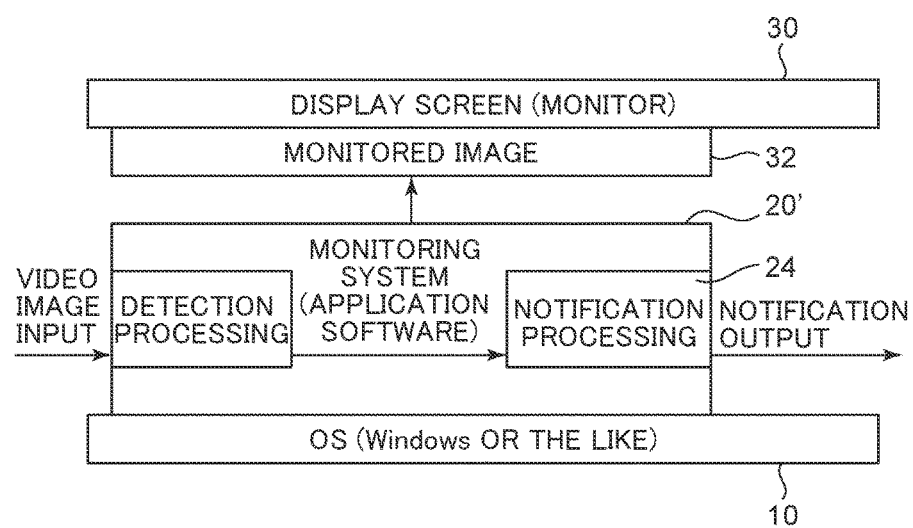
FIG. 13 is a block diagram showing an example of the conventional method for automating a monitoring operation.

FIG. 13 shows an example of the conventional method for automating a monitoring operation.

In this example, there is provided a monitoring system 20' to which a reconstruction of adding software executing detection processing 22 and notification processing 24 of a camera image to monitoring software is made, and the system is constructed by performing operation verification, modification, and the like to the existing software.

However, in the reconstruction, stoppage of the monitoring system 20' occurs for confirmation. This cannot be responded unless a monitoring software manufacture has expertise in image data processing technology. In a case of outsourcing, it is necessary to disclose the monitoring software. Further, there is a possibility this cannot be responded unless a developer of the monitoring software is present. If any failure occurs to the additionally reconstructed part, even visual monitoring cannot be performed.

Figure 14:
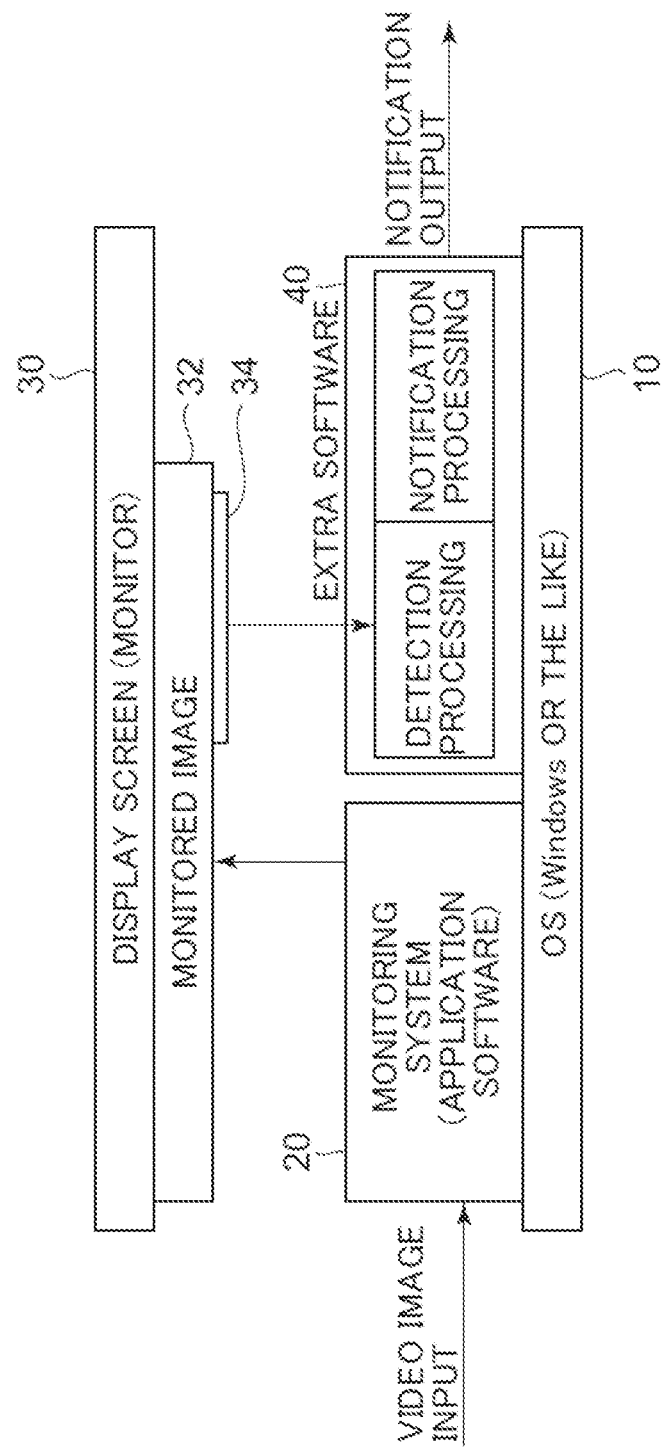
FIG. 14 is a block diagram showing a configuration of the embodiment according to the present invention.

A system solving such a problem is a system shown by the block diagram of the embodiment according to the present invention in FIG. 14.

This system is realized by extra software 40, instead of reconstruction of the existing monitoring system shown in FIG. 12. The extra software 40 sets one or more arbitrary areas on a display screen, transfers image data within a set area 34 sequentially to a memory (not shown), executes data processing of a signal in the memory to perform intended determination, and externally outputs a result of the determination.

Here, a number of the set area 34 set on the display screen 30 may be more than one. In this case, each of the set areas may have the same position and the same size, or at least one of the position and the size may be different from each other. The image data processing to each set area may be the same or different. For example, different types of the image data processing may be respectively performed to the set areas having the same position and the same size. Further, the image data processing to each set area may be executed individually, or in combination with the image data processing to a different set area. For example, by combining a plurality of results, it is possible to output determination of an outcome after all conditions are met.

The determination of the outcome of the image data processing may be made individually or in combination with a different screen.

An output of the result may be performed commonly, individually, or in combination with a specific screen.

A name may be assigned individually to each of the one or more set areas 34. For example, instead of simple numbers, names such as "front door", "windows in the living room", "bed", and "kitchen" may be assigned depending on the corresponding monitoring areas. It is possible to provide information to be sent out with meaning by sending an output such as "abnormity at windows in the living room" via e-mail or the like when abnormity in the display screen is detected, for example. Further, it is possible to specify different image data processing to each of the monitoring areas.

According to the system of this embodiment, the following effects may be provided.
(1) The system operates as software different from the monitoring system, and it is not necessary to stop the monitoring system.
(2) In a case of outsourcing, the system may be provided independently of the monitoring software.
(3) It is possible to make confirmation in parallel with visual monitoring.
(4) The conventional visual monitoring can be performed even in a case of failure.

Practical Example

Hereinafter, a practical example according to the present invention will be described. FIG. 15 shows an initial screen for setting to a name, a type of image data processing, and the like to a set area set on the display screen. Here, the set area set on the display screen is referred to as a "sensor".

In FIG. 15, an arbitrary number of sensors, logical sensors, and outputs may be set.

A "sensor name" in an upper part is a name assigned to each of set areas.

A "logical sensor" in a middle part is a virtual sensor combining the "sensors". In definitional identity L1=, . . . , L4=, 0 is ON, and 1 is OFF. A value over 1 is assumed to be 1. Sensor numbers are set as S1, S2, . . . .

When the definitional identity is L1=S1*S2, this means logical multiplication (AND) of S1 and S2.

When the definitional identity is L1=S1+S2, this means logical add (OR) of S1 and S2.

FIG. 16 is a selection screen of a type of the sensor. Clicking a filled inverted triangle on the right end of "type selection" for each of the sensors, a function list is shown as a pull-down menu.

FIG. 17 shows a screen for setting "intruder when red lamp is lit" in this list. Specifically, while red lamp is lit, an area that is dangerous and in which entering is prohibited is monitored.

In the display screen, a camera image of an area in which passage is prohibited and an image of the lamp is displayed.

When a person monitors the display screen, the person gives warning through a microphone if a person is seen while red lamp is lit.

The following shows this operation performed by software of the screen sensor of this practical example.

In a screen of a sensor #1, an area is set for a portion of the lamp, and detection of red is performed.

In a screen of a sensor #2, a dangerous area including the lamp is set, and motion (intrusion of a person) is detected.

A result of the screen of the sensor #2 is effective only when red is detected in the screen of the sensor #1.

When motion is detected in the screen of the sensor #2 while the red lamp is detected in the screen of the sensor #1, alerting sound message is reproduced to give warning.

Figure 18:
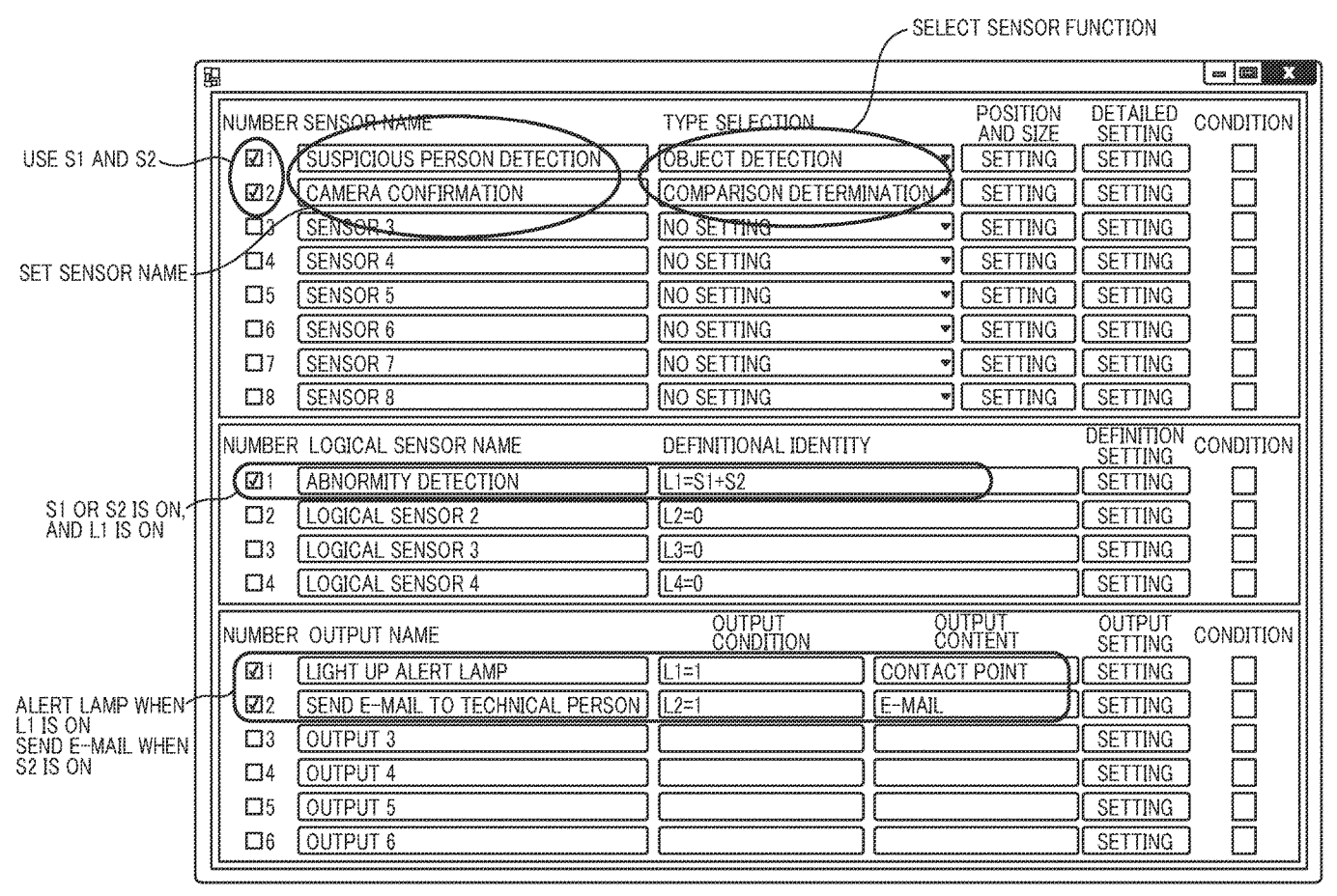

FIG. 18 is a setting screen for security and camera breakdown.

A difference of an output depending on a screen is as follows.

It is assumed that the display screen shows a camera image for monitoring intrusion of a suspicious person.

When a person monitors, the person contacts a security department when a suspicious person is found. Further, when breakdown of the camera occurs, the person contacts a technical department.

The following shows this operation performed by software of the screen sensor of this practical example.

In the screen of the sensor #1, an area in which people pass is set, and detection of an object (intruder) is performed.

In the screen of the sensor #2, an area that is always displayed the same is set, and brightness measurement is performed.

When an object is detected (an intruder is found) in the screen of the sensor #1, an alert lamp in a security room is lit to inform the security department.

If the screen of the sensor #2 shows significantly unusual brightness, an alert lamp in the security room is lit to inform the technical department by e-mail as breakdown of the camera has possibly occurred.

In this manner, by setting a type of the image data processing, a content of the processing, an output condition, and a content of the output to each of the sensors, a desired output may be obtained.

Examples of the types of the image data processing include, but not limited to, the following, as shown in the pull-down menu in FIG. 16:
1. motion detection (cf. FIG. 6 and its description described above);
2. color detection (cf. FIG. 4 and its description described above);
3. object detection (cf. FIG. 7 and its description described above); and
4. point gauge (cf. FIG. 3 and its description described above).

INDUSTRIAL APPLICABILITY

The present invention may be advantageously employed in applications, for example, listed in the following.
Company Use
(1) Elimination or reduction of personnel for a manned image monitoring system and a manned process monitoring system
(2) Stable system operation (eliminating factors such as individual difference, fatigue, and carelessness)
(3) Improvement in functions without system stoppage, and continuous improvement of the functions.
Personal Use
Effective utilization of a built-in camera or a USB camera provided for a display terminal.
Compatibility with cameras is irrelevant, as the processing is performed to a display content.
(1) Nightwatch monitoring by the display terminal (abnormity alert)
(2) Monitoring during absence (notification by e-mail, storage of image)
(3) Acting for simple operations performed while watching the screen

The invention claimed is:
1. A method for processing an image within a display screen of a computer, the method comprising the steps of:
setting one or more arbitrary areas to be displayed on a display screen of the computer;

sequentially obtaining pieces of image data for the set areas from image data displayed on the display screen by a standard capture function of an operation system of the computer, and transferring the obtained pieces of image data to a memory;

performing determination on a predetermined matter by data processing to the pieces of image data in the memory; and externally outputting a result of the determination.

2. The method for processing an image within a display screen according to claim 1, wherein
the result of the determination is output as information based on software.

3. The method for processing an image within a display screen according to claim 1, wherein
the result of the determination is output as an electric signal to at least one of a serial port and a parallel port.

4. The method for processing an image within a display screen according to claim 1, wherein
the result of the determination is output to a network, in a form of at least one of e-mail, information data, and image data.

5. The method for processing an image within a display screen according to claim 1, wherein
either a different or an identical type of data processing is performed to corresponding pieces of image data for the plurality of areas on the display screen, at least one of a position and a size of each of the pieces of image data being either different from or identical to a position and a size of another piece of image data, the different or identical data processing being executed individually or in combination with data processing to another area.

6. The method for processing an image within a display screen according to claim 1, wherein
a name is individually assignable to each of the one or more areas on the display screen, and when the result of the determination is output, the name of the corresponding area is attached to the output.

7. The method for processing an image within a display screen according to claim 1,
wherein the determination on the predetermined matter is defined as at least one of the followings:
determination as to whether change is detected;
determination as to whether motion of an object is detected;
determination as to whether quiescence of an object is detected;
determination as to whether arbitrary color range and size are detected;
determination on measurement processing;
determination as to whether abnormality is detected; and
determination on filtering processing.

8. A non-transitory computer-readable storage medium storing an image processing program, the image processing program causing a computer to perform the steps of:

setting one or more arbitrary areas to be displayed on a display screen;
sequentially obtaining pieces of image data for the set areas from image data displayed on the display screen by a standard capture function of an operation system of the computer, and transferring the obtained pieces of image data to a memory;
performing determination on a predetermined matter by data processing to a signal in the memory; and
externally outputting a result of the determination.

9. The image processing program according to claim 8, causing the computer to further perform a step of:
outputting the result of the determination as information based on software of the computer.

10. The image processing program according to claim 8, causing the computer to further perform a step of:
outputting the result of the determination as an electric signal to at least one of a serial port and a parallel port.

11. The image processing program according to claim 8, causing the computer to further perform a step of:
outputting the result of the determination to a network, in a form of at least one of e-mail, information data, and image data.

12. The image processing program according to claim 8, causing the computer to further perform a step of:
conducting either a different or an identical type of data processing to corresponding pieces of image data for the plurality of areas on the display screen, at least one of a position and a size of each of the pieces of image data being either different from or identical to a position and a size of another piece of image data, the different or identical data processing being executed individually or in combination with data processing to another area.

13. The image processing program according to claim 8, causing the computer to further perform a step of:
individually assigning a name to each of the one or more areas on the display screen, and of attaching the name of the corresponding area to the output when the result of the determination is output.

14. The non-transitory computer-readable storage medium according to claim 8,
wherein the determination on the predetermined matter is defined as at least one of the followings:
determination as to whether change is detected;
determination as to whether motion of an object is detected;
determination as to whether quiescence of an object is detected;
determination as to whether arbitrary color range and size are detected;
determination on measurement processing;
determination as to whether abnormality is detected; and
determination on filtering processing.

* * * * *